Figure 5:
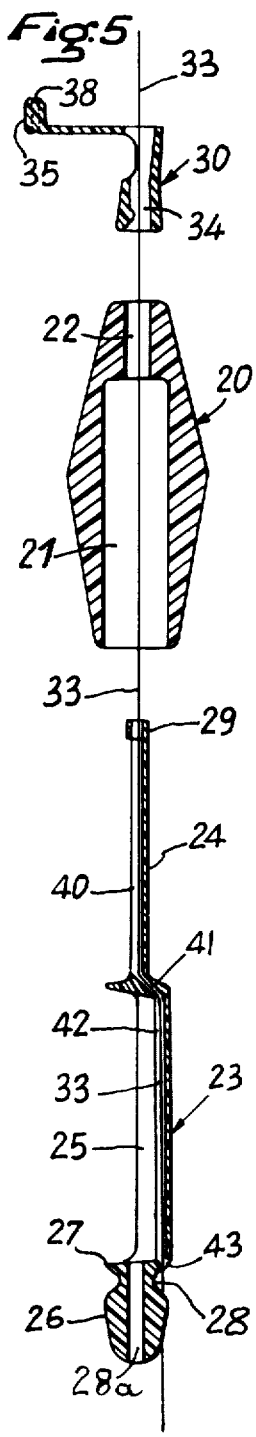

United States Patent
Modeme

[15] 3,694,951
[45] Oct. 3, 1972

[54] FISHING FLOAT

[72] Inventor: Robert L. Modeme, Paris, France

[73] Assignee: M.E.P.P.S., Manufacture d'Engins de Precision pour Peches Sportives, Paris, France

[22] Filed: July 16, 1970

[21] Appl. No.: 55,397

[30] Foreign Application Priority Data

Aug. 11, 1969 France......................6926452
Nov. 13, 1969 France......................6939409

[52] U.S. Cl. ..................43/41.2, 43/43.11, 43/44.88, 43/44.99
[51] Int. Cl. ......................A01k 93/00, A01k 97/04
[58] Field of Search................43/41.2, 43.11, 44.88

[56] References Cited

UNITED STATES PATENTS 3,303,596  2/1967  Lewis et al..................43/41.2
2,807,115  9/1957  Turner.....................43/43.11

Primary Examiner—Samuel Koren
Assistant Examiner—Daniel J. Leach
Attorney—McGlew and Toren

[57] ABSTRACT

The device of float type comprises a first element having in its upper part means for the attachment of the line, and in its lower part an external neck for winding thereon part of the line to be immersed extending beyond the point of attachment, a second element of a density adapted to ensure the buoyancy of the whole and movable relative to the first element between a bottom position in which the two elements confine a closed housing for the reception of the hook, the bait being attached to the hook and eventually separate fish food particles, and a top position in which the said housing is open to the exterior, the whole being such that on contact with the water, the second element is displaced relative to the first for opening the housing, releasing the hook bait and eventual particles and subsequent unwinding of the line from the neck.

15 Claims, 14 Drawing Figures

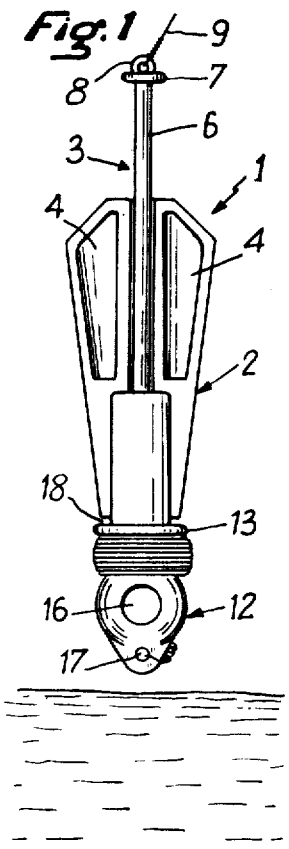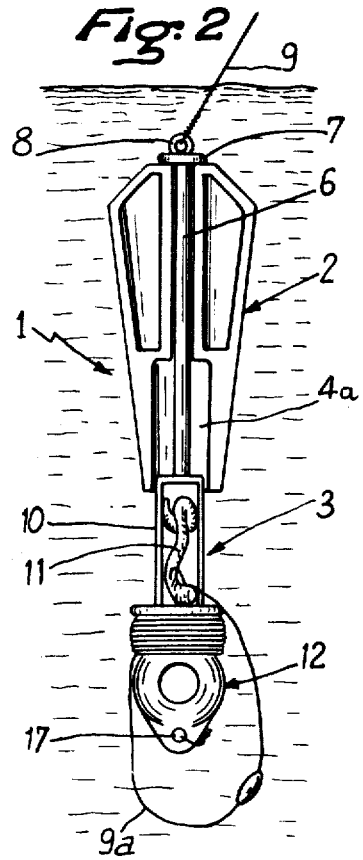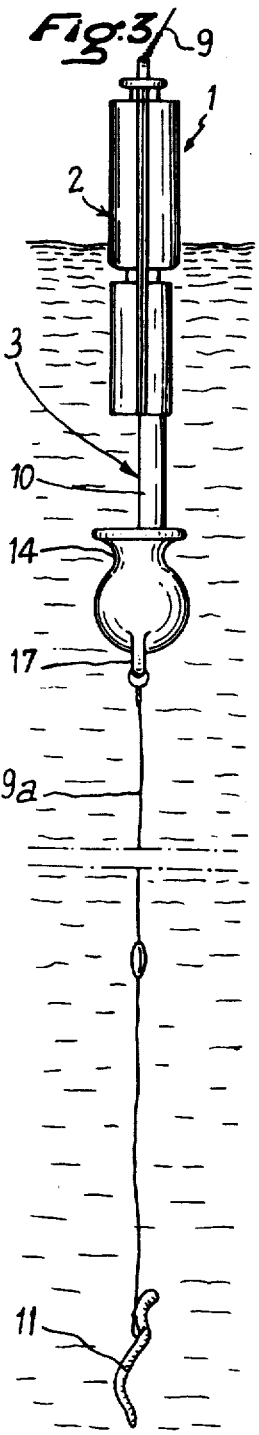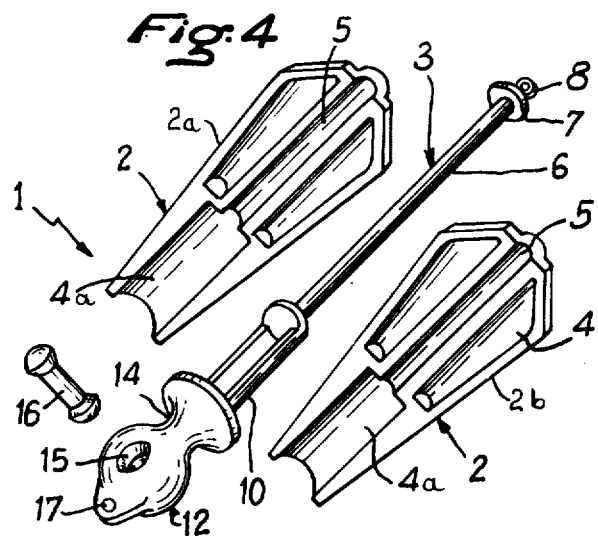

PATENTED OCT 3 1972 3,694,951

SHEET 2 OF 4

INVENTOR
ROBERT L. MODENE
BY McGlew & Toren
ATTORNEYS

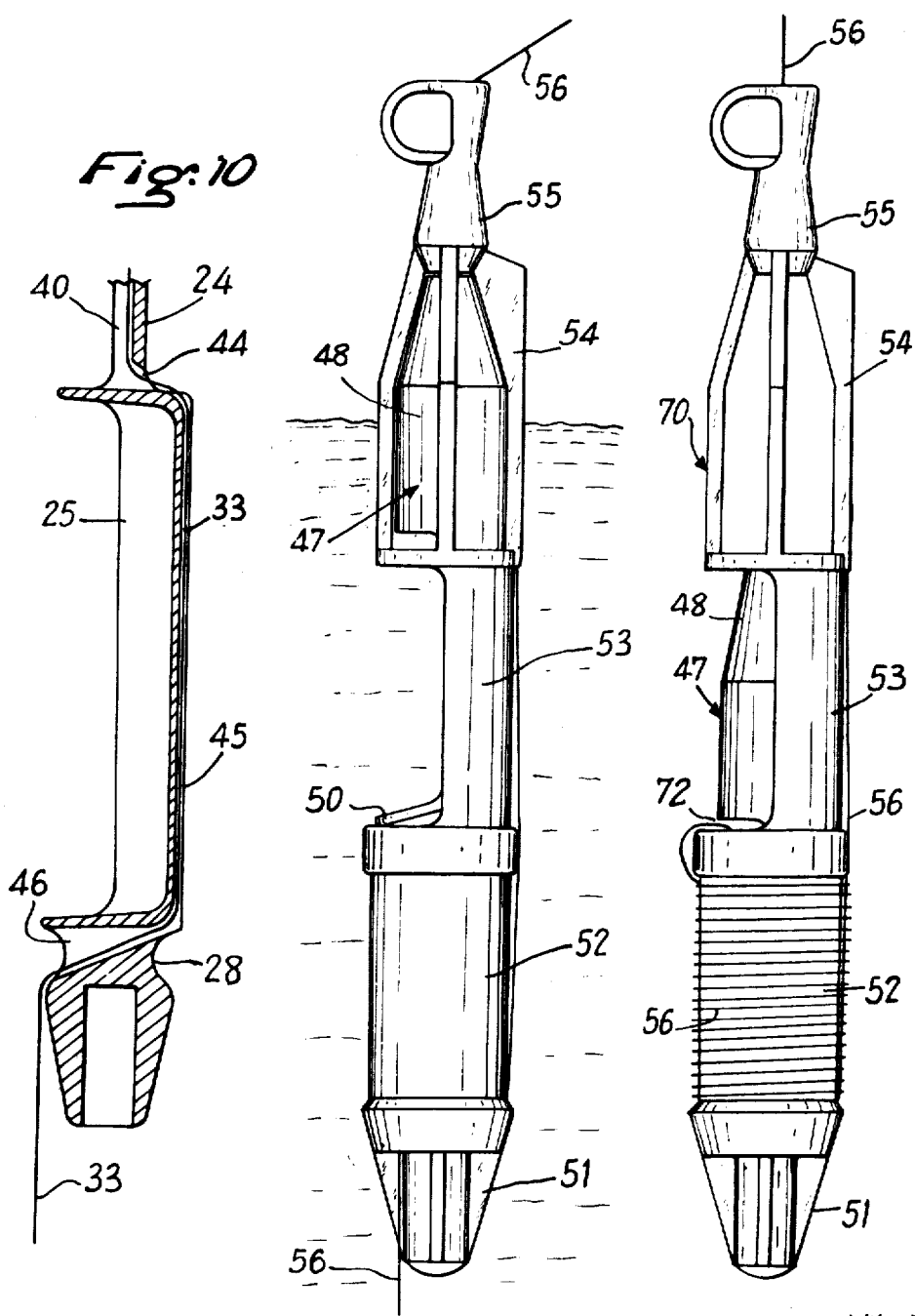

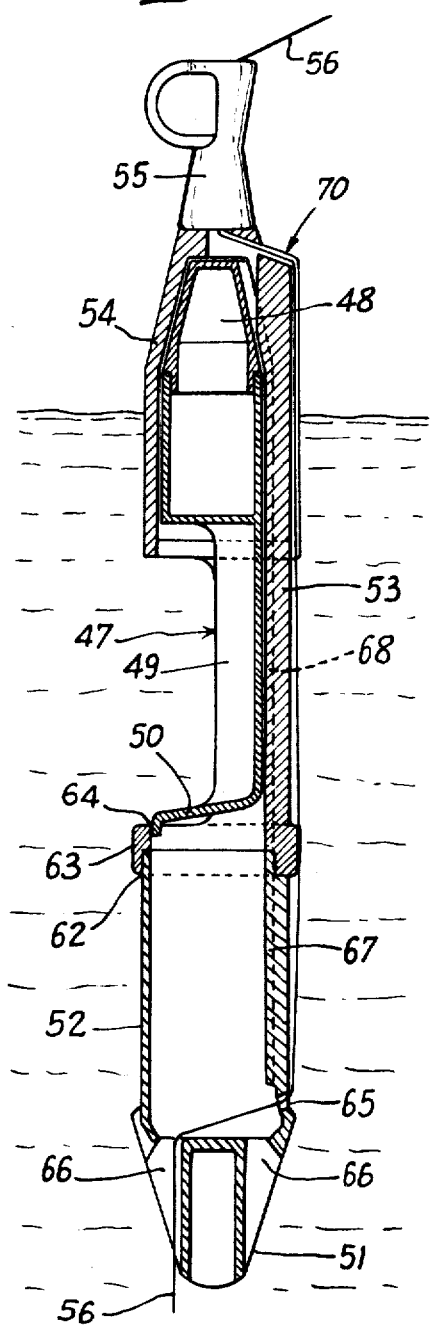
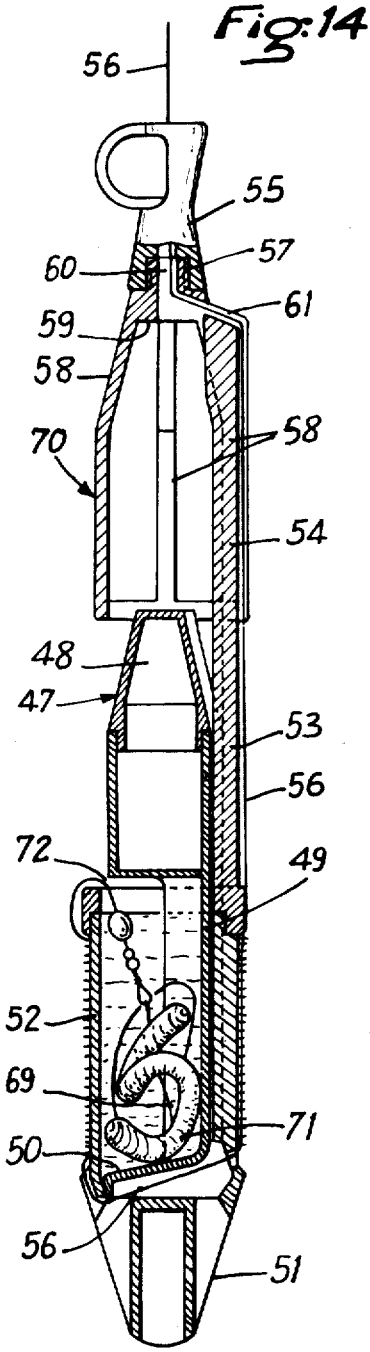

FISHING FLOAT

The invention concerns devices of the float type for fishing by casting or ground-bait fishing.

Its object is to make it possible, at the spot selected for fishing, to place the hook and bait at the desired depth and eventually to drop separate fish food particles while ensuring protection of the bait up to the contact of the device with the water.

Its object is also to provide a compact unit which is easy to cast and which avoids any tangling of the line, particularly in fishing by casting.

Its object is also to ensure that when the device comes into contact with the water, it assumes the correct vertical position and is not subjected to the return force towards the rod, as occurs with conventional sliding floats.

Another object of the invention is to be able to recover on the rod practically the entire length of immersed line, without the float causing trouble, irrespective of the fishing depth.

For this purpose, according to the invention, a device of float type for fishing by casting or ground-bait fishing is characterized in that it comprises a first element having in it upper part means for the attachment of the line, and in its lower part an external neck for winding a part of the line to be immersed and extending beyond the point of attachment, a second element of a density adapted to ensure the buoyancy of the whole and movable relative to the first element between a bottom position in which the two elements confine a closed housing for receiving the hook, the bait being attached to the hook and eventually the fish food particles and a top position in which the said housing is open to the outside, the whole being such that, on contact with the water, the second element is displaced relative to the first for the opening of the housing, the disengagement of the hook and the bait, and the subsequent unwinding of the line from the neck and the dropping of the eventual fish food particles.

According to another feature of the invention, which is advantageously used together with the preceding feature, the means for attaching the line to the first element are adapted to be released by a predetermined up-pull exerted on the line from the fishing rod, such that the entire length of initially immersed line may slide relative to the float and may be recovered. On the other hand a downwardly-exerted pull does not overcome the locking of the said means. Furthermore, an unwanted release of the means of attachment is not sufficient to overcome the locking of the line because the said means are adapted to return to the locking position of their own accord.

On its entry into the water, the device appears in compact form and the hook with the bait are protected in the housing ; there is, therefore, no risk of loss or deterioration of the bait, or of tangling the line. Furthermore, the line unwinds from the float itself to the desired depth, which obviates the float being urged towards the fishing rod, because the float is not subjected to any return force.

Furthermore, the line is compactly arranged on the device, which facilitates casting compared with the case where the length of line to be immersed is free.

Figure 6:
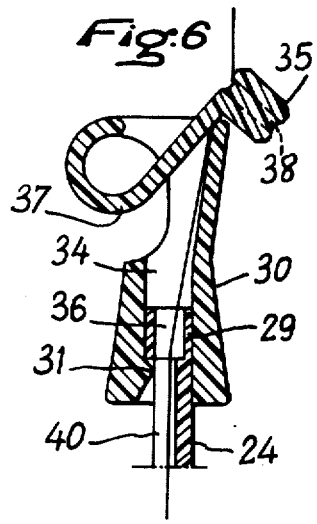
Figure 7:
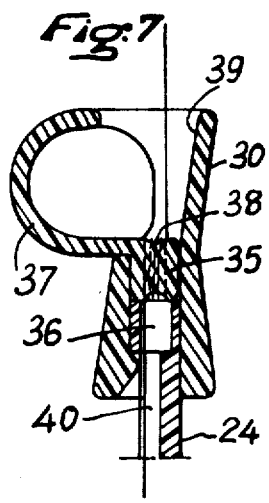
Figure 8:
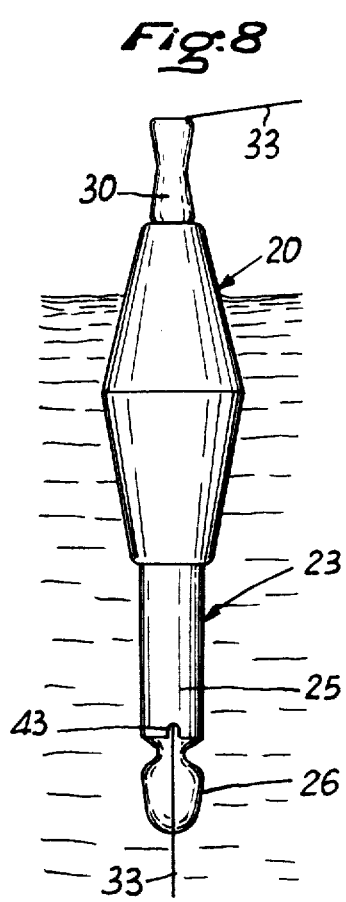
Figure 9:
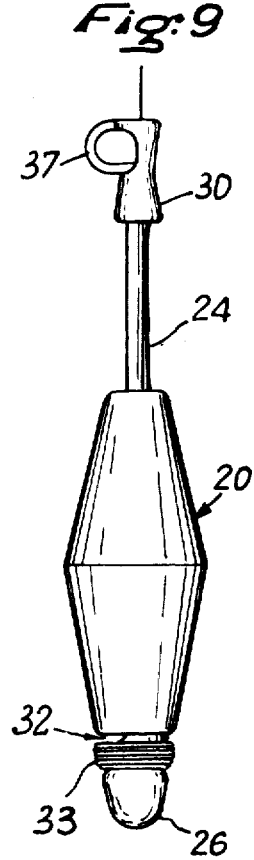

The invention will be better understood with the aid of the following description relating to various embodiments of the invention and with reference to the accompanying drawings, in which :

FIG. 1 is a front elevation, partly in section, of a first embodiment of a float device according to the invention before its impact with the surface of the water, FIG. 2 is a rear elevation, partly in section, of the float device of FIG. 1 just after its entry into the water, FIG. 3 is a side view of the float device of FIG. 1 in the normal position of use in the water, FIG. 4 is an exploded perspective view of the constituent elements of the float device of FIG. 1, FIG. 5 is an exploded section of a second embodiment of a float device according to the invention, the elements being shown in their order of assembly, FIG. 6 is a section on a larger scale of part of the float device of FIG. 5 already assembled, FIG. 7 is a section similar to FIG. 6 showing the said part in its position for locking the line, FIG. 8 is an external side view of the float device of FIG. 5 in the normal position of use in the water, FIG. 9 is an elevation of the float device of FIG. 5 before its impact in the water, FIG. 10 shows in part section a modification of an element of the float device according to FIG. 5, FIGS. 11 and 12 are external views of another modification in the position of use in and out of the water, respectively, and FIGS. 13 and 14 are axial sections of FIGS. 11 and 12, respectively.

Referring first of all to FIGS. 1 to 4, relating to a first embodiment of the invention, the figures show a combined float 1 comprising in its entirety two elements 2 and 3 axially slidable on each other. The element 2 forms the actual float, intended to remain on the surface of the water, while the element 3 is intended to sink in the water (FIG. 3).

The buoyancy of the element 2 is ensured by the material of which it is made and by at least one watertight chamber 4 formed during assembly, for example, by soldering or welding together two half-shells 2a, 2b, forming the element 2.

The element 2 has an axial cylindrical recess 4a open at the bottom and prolonged in its upper part by an upwardly open coaxial passage 5.

The element 3 comprises a cylindrical rod 6 surmounted by a collar 7 forming a stop for the float element 2 in the top position and carrying a ring or the like 8 for the attachment of one end of the line 9 connected to the fishing rod. The rod 6 is extended downward by a part 10 which, in co-operation with the recess 4a, forms a housing for the hook and bait 11. In the embodiment adopted, this part 10 is formed by a cradle (FIGS. 2 and 4) in the form of a semicylindrical hollow body, which receives the hook and bait 11, and, eventually, the fish food particles (not shown), and the upper radial face of which forms an abutment for the float element 2 in the bottom position (FIG. 1). The stroke of the float 2 is therefore equal to the difference between the lengths of the rod 6 and passage 5. Below the part 10, there is provided a base 12 forming a weight for balancing the element 3. This base 12 comprises an upper collar 13, forming one face of the housing, a neck 14, a hole 15 for receiving a lead weight 16 and a ring or hole 17 for the attachment of one end of the line 9a to be immersed.

For using the float device of the invention, the line 9a after its attachment at 17, is wound around the neck 14 (FIGS. 1 and 2) and the end part is lodged in the cradle 10, such that the line 9a is more or less taut between the attachment 17 and the winding, and between the winding and the cradle 10. In this way, the line has no slack portion, thus obviating any risk of tangling or snagging. The bait 11 and hook having been placed in the cradle 10, it is merely necessary to close this housing by allowing the float 2 to drop by gravity to the closed position when it then rests at the top of its cavity 4a against the upper part of the cradle 10.

An advantageous feature of the invention resides in the fact that a gap 18 is left between the elements 2 and 3 and provides communication between the recess and the outside, and in that there is a slight clearance between the rod 6 and the passage 5. As a modification, a vent could be provided to establish communication between the top of the recess 4a and the outside.

The float, when ready to be cast, appears as shown in FIG. 1; the float element 2 remains in the closed position by gravity. On casting, the element 2 still remains in the closed position by the centrifugal effect. The centrifugal force acts both to send the float to a distance an to keep the element 2 in the closed position.

On contact with the water, the combined action of the element 2 and the weighted base 12 forces the float to assume a vertical position, the element 2 sliding upward on the rod 6 for releasing the cradle ; at the same time, the interior of the float is rapidly filled with water, which expels the air through the space existing between the rod 6 and the passage 5. Once the cradle is opened, the bait 11 and hook fall out by gravity, causing the line 9a to unwind off the neck 14. The float then appears as shown in FIG. 3, the element 2 being in the top position and the element 3 in the bottom position : the line 9a is completely unwound, the bait 11 then being at the selected depth. Meanwhile, the eventual fish food particles get out of the cradle and sink or float about the device. The element 2 is, of course, adapted to ensure buoyancy of the device.

When the float is brought out of the water, the element 2 drops into its bottom position and the device is taken back by the user.

The embodiment of the float of FIGS. 5 to 9 is similar to the foregoing, as regards the two sliding elements, from which it differs in constructional details. The float 20 is made in one piece ; it has a lower cavity 21 and an upper coaxial passage 22. The rod 24 comprises an intermediate cradle 25 and a base 26 provided with a collar 27, a line winding neck 28 and a housing 28a for lead weight (not shown).

The upper end 29 of the rod 24 can pass freely through the passage 22 and is provided with a tip 30, forcibly pushed on and fixed by hooking means 31. This tip forms a stop for the top position of the float element 20. In the bottom position, the element 20 rests as before on the top of the cradle 25, and a space 32 (FIG. 9) is also left to allow the water to enter.

It will be noted that neither the base 26 nor the rod 24 has any point of attachment of the line ; indeed, this embodiment, as will be explained later, makes it possible to slide the entire length of the line on the float during recovery of the line, hook and catch.

For this purpose, the tip 30 comprises means for fixing the line 33 in a manner for release in one direction. The release of the line is produced by a pull exerted on the line by means of the fishing rod, while locking persists when the line is drawn downward, for example, by the fish caught on the hook.

The tip 30 has an axial cavity 34 in which there is fitted without play a cylindrical locking piece 35, whose diameter is larger than that of the bore 36 of the end of the rod 24, such that the latter forms an axial top. The locking piece 35 is connected to the body of the tip 30 by a flexible lug 37. The body of the tip 30 and the flexible lug 37 are adapted such that, in the position of rest, the locking piece is returned resiliently to its recess 34. The tip is designed to be manufactured in a single piece, for example, by casting or injection.

The locking piece 35 has a neck 38, the axis of which is perpendicular to the axis of the said piece for receiving at least one turn of line 33. The line enters the tip 30 through a flared opening 39, is wound in at least one winding on the neck 38, enters the rod 24 through the bore 36, follows the rod 24 in a longitudinal groove or passage 40, enters the cradle 25 through an orifice 41, follows the rear internal face of the cradle in a groove 42 and leaves the cradle at the back through an orifice 43. Thereupon, the line is wound around the neck 28 and its end is housed in the cradle 25.

In the modification of FIG. 10, the groove 40 communicates with the outside, at the rear of the cradle 25, by an orifice 44, which opens at the level of an external groove 45 extending over the entire length of the outer rear face of the cradle ; the line is held in this groove 45 by being passed through a lower orifice 46 opening at the front, on the front side of the cradle at the level of the neck 28 and having a flared front part for facilitating the movement of the line.

For operation, a short length of line 33 is wound around the neck 38, once the fishing depth has been selected. The piece 35 is placed in or is allowed to return to its recess 34, the line passing beyond the lower end of the device is drawn taut, the line is wound around the neck 28 and, as before, the hook, the bait being attached to the hook and eventually the fish food particles (not shown) are placed in the cradle, the float element 20 being then allowed to drop. The device then appears (FIG. 9) in a manner similar to the preceding float (FIG. 1), except as regards the fixing of the line. There is no risk that the fixing of the line provided by the tip 30 would become loose because the winding on the neck 28 prevents any upward movement of the piece 35 around which the line is wound, the lower winding itself being locked by the cradle.

The device may then be cast under the same conditions as the float in FIGS. 1 to 5. In contact with the water, the cradle opens and the line is completely unwound until it is held by the piece 35, which is its only point of attachment to the float, while the eventual food particles get out of the cradle.

The force necessary for moving the piece 35 out of its recess is defined by the fit of the piece and by the number of windings of line around the neck 38. This force is fixed such that it is more than the normal pulling forces during use, particularly during recovery. However, unexpected release of the piece 35 by an accidental jerk or shock is not troublesome because as soon as the jerk or shock ceases, the combined action of the resilient lug 37 and the downward pull on the line by the weight of the sinker and possibly by the catch returns the piece 35 to its recess without the line having been able to unwind off the groove 38.

To recover the device, the user pulls on the line 33 by means of the fishing rod. If the piece 35 is not disengaged before the tip 30 comes into contact with the end ring of the fishing rod, it will be disengaged on contact with the said ring, because the body of the tip bears against the ring and the pull exerted on the line is sufficient to cause the piece 35 to be disengaged. Once this piece is disengaged, it is stressed by the line which unwinds off it. If the piece 35 becomes disengaged prematurely before the tip 30 touches the ring, the winding is kept on the neck 38 ; the float therefore remains held by the line until there is contact with the ring, which produces the release of the float. In either case, the device is therefore liberated from the line and the line can slide in it until the hook or the sinker abuts abuts against the edge of the orifice 43 or 46.

As follows from the foregoing, however, the devices of FIGS. 5 to 10 may be used as float devices having a fixed anchoring point, unlike float devices of the locking ball type, in which any upward pull on the line produces an irreversible ascent of the hook.

With a float device according to the invention, it is possible to fish at any distance accessible by casting and at any depth. Since the bait is protected, there is no risk of losing it or damaging it ; in addition, since the line is rendered very stationary and has no slack part, any undesirable unwinding and tangling are obviated and casting is easier. Furthermore, the bottom of the line may be provided with any conventional equipment without the latter impeding the operation of the device.

In the preceding embodiments, the float element was outside the sinker element. In the modification of FIGS. 11 to 14, the float element is, on the contrary, housed in the interior of the sinker element.

The floating element 47 comprises a water-tight upper chamber 48, filled for example with air, which forms the float. It is prolonged downwardly by a cradle 49, similar to the preceding cradles and constructed in the form of a hollow semicylinder, the bottom 50 of which is inclined downward on the open side of the cylinder and has an elliptical form corresponding to the oblique section of the cylinder.

The sinker element 70 comprises from the bottom upward : a base 51 which receives a lead balancing weight (not shown); a casing 52 forming a sheath ; an intermediate part 53 ; and an upper cage 54 surmounted by a tip 55 for the detachable fixing of the line 56.

The tip 55 is similar to the tip 30 of FIGS. 5 to 9 and will not be described again. It is fixed to the cage in any desired manner, for example, by screwing as shown at 57 in FIG.14 or in the same way as in FIGS. 6 and 7.

The cage 54 is formed of vertical bars 58, four in number, for example, and it comprises an upper inner face 59 forming a stop for the floating element 47 in the top position (FIGS.11 and 13). The cage 54 also has an upper bore 60 for the passage of the line and an external vertical groove 61 communicating with the bore 60.

The intermediate part 53 serves to connect the cage 54 and sheath 52 together, and it should permit the cradle 49 to be open when the float 47 is in the top position. For this purpose, it is made, for example, semicylindrical, open on the same side as the cradle 49, which reinforces the rigidity of the whole device compared with what it would be if this part were a simple rod.

The sheath 52 consists of a hollow cylindrical tube, forcibly fitted at 62 in a hollow expanded part 63 provided on the bottom end of the intermediate part 53. This expanded part participates at 64 in the guiding of the float (FIG. 13), which has a flange in the interior of this expanded part itself for the top position of the float 47.

The sheath is cast preferably in one piece with the base 51. A lower orifice 65 through the sheath and flared, substantially vertical orifices 66 are provided for the passage of the line 56 and for the circulation of air and water. The upper edge of the base has an external diameter larger than that of the sheath, such that due also to the expanded part 63 the sheath forms a large bobbin for the winding of the line.

For assembling this device, the float 47 is passed through the expanded part 63, in which the top edge of the sheath 52 is inserted with a forcible fit. The float is able to slide vertically, and any relative rotation is prevented by a vertical rib 67 of the sinker element engaging a corresponding inner groove 68 of the float, opposite the open face of the cradle 49.

For the preparation of the device, after the desired length of line has been selected and the tip 55 locked as before, the line 56 is drawn down through an orifice 66, and the line is wound on the sheath 52. The end of the line with its hook 69, bait 71 and eventually fish food particles are placed in the open cradle 49 which is passed or allowed to drop into the closed position. The device then appears as shown in FIG.12, in which the cradle locks the winding which in its turn locks the tip 55.

On contact with the water, the device assumes a vertical position under the action of the lead of the base 51 and the float 47, which brings about the relative ascent of the float and therefore the opening of the cradle 49. The hook, bait and eventual particles fall by gravity along the inclined plane 50 and the line unwinds completely until it is no longer held except by the tip 55 (FIGS.11 and 13).

When the line is pulled in, everything takes place for the line as in the preceding embodiments. As regards the float 47, it falls by gravity into the sheath 52 until it abuts against the top of the base.

It should be noted that discharge of air and entry of water take place without difficulty when the device enters the water ; the same applies to the discharge of water and the entry of air where the device is brought out of the water. Indeed, the cage 54 allows the air to enter and leave and the orifices 65 and 66 allow the sheath 52 to fill and empty without any difficulty. There may also be provided a considerable gap 72 between the float 49 and the sheath 52 to permit the water to enter the cradle as soon as the device enters the water.

According to another modification, not shown, the cage 54 and the intermediate past 53 may be suppressed by mounting the tip 55 directly on the upper end of the sheath 52 and by providing another stop for the top position of the float 47. In this case, the tip would be offset relative to the vertical axis of the device.

I claim:

1. Float type device for use with a fishing line for fishing by casting and for ground-bait fishing, comprising an axially-extending first element arranged to have its axis extending vertically when used immersed in water, said first element comprising an upper part and a lower part, means on said upper part for attaching the fishing line thereto and an end portion of the fishing line spaced from the point of attachment arranged to receive a hook, said lower part having an exterior neck on which the portion of the fishing line to which the hook is attached can be wound, a second element movably mounted on said first element for displacement between a lower position and an upper position, said second element having a density sufficient to afford buoyancy to said device when it is immersed in water, in its lower position said second element combines with said first element to define a closed chamber arranged to receive the end of the portion of the fishing line to which the hook is attached and also to receive separate fish food particles, in its upper position said second element is displaced from and opens said chamber to the exterior, so that when the device is arranged with said second element in its lower position and with the end of the line with the hook within said closed chamber and said device is placed in water, the buoyancy of said second element displaces it into its upper position, opening said closed chamber and thereby releasing the end of the line with its hook so that the portion of the line can unwind from about said exterior neck.

2. Device according to claim 1, wherein the fishing line is fixed to said first element solely at said point of attachment so that it is releasable in one direction by said means for attaching line to said first element.

3. Device according to claim 2, wherein said means for attaching the line comprises a tip fitted on the upper end of said first element and includes a flexible lug, a piece connected by said flexible lug to the body of said tip and arranged to be engaged in a recess of said tip to which the line passes, said piece reenforcing the attaching action when a downward pull is exerted on the line, and said piece emerging from the recess for detaching the line when a pull of at least a predetermined value is exerted on the line in the direction for the removal of said piece from said recess.

4. Device according to claim 3, wherein the said piece has a neck for winding the line thereon in several windings, said neck being in an axial plane of the device when said piece is in position for attaching the line.

5. Device according to claim 3 wherein the flexible lug is adapted to return to its recess the said piece when the latter is not subjected to any external force.

6 Device according to claim 3, wherein the tip does not form an integral part of the first element but is forcibly fitted on the upper end of the said first element where it is held by friction and forms a stop for the second element in the upper position, the said upper end forming a lower stop for said piece in the attaching position.

7. Device according to claim 3, wherein said first element has a vertically extending longitudinal passage, said recess for the reception of said piece communicates with the longitudinal passage of said first element, said first element further comprises a longitudinal groove for sliding of the line, a first orifice between said longitudinal passage and said groove, and a second orifice between said groove and said neck adjacent to said groove, so that the portion of the line to which the hook is attached is not in contact within the device either with said second element or with the hook and bait accommodated in said housing.

8. Device according to claim 7, wherein said longitudinal groove is provided on the external surface of said first element intermediate the upper and lower ends thereof.

9. Device according to claim 7, wherein said longitudinal groove is provided on the internal surface of said first element intermediate the upper and lower ends thereof.

10. Device according to claim 3, wherein the fishing line is fixed to said first element by said tip in that said tip is held under tension in the attaching direction by the winding of the line, and in that the line is prevented from unwinding by the end part of the line retained in the housing, the opening of said housing when said second element is displaced from its lower into its upper position producing successively the unwinding of the line and the unlocking of the tip which remains locked until there is an upward pull of the line.

11. Device according to claim 1, wherein the line is in two pieces, one fixed at its end to said point of attachment of said first element and the other fixed to the lower end of said first element.

12. Device according to claim 1, wherein said second element is hollow and is slidingly arranged around an axially extending part of said first element having a recessed zone therein for combining with said second element in forming said chamber, and stop means on said first element for defining the upper and lower positions of said second element.

13. Device according to claim 12, wherein a rod forming a guide for said second element extends upwardly from said recessed zone, and said second element having an opening for the passage therethrough of said rod.

14. Device according to claim 1, wherein said first element is hollow and is slidingly arranged around a part of said second element, said first element has an intermediate recessed zone for combining with said second element forming said chamber, and said first element having stop means for defining the upper and lower positions of said second element.

15. Device according to claim 1, wherein said first and second elements are arranged in the closed position of said chamber so that said chamber communicates with the outside for the entry of water, and means provided for the escape of air expelled by the water entering said chamber during entry of device into the water and for the escape of the water when the device is removed from the water.

* * * * *